(12) United States Patent
Oniki et al.

(10) Patent No.: US 10,270,969 B2
(45) Date of Patent: Apr. 23, 2019

(54) IMAGE PROCESSING APPARATUS CONFIGURED TO SHARPEN IMAGE HAVING COMPLEX BLUR, IMAGE CAPTURING APPARATUS, IMAGE PROCESSING METHOD AND STORAGE MEDIUM STORING IMAGE PROCESSING PROGRAM

(71) Applicant: CANON KABUSHIKI KAISHA, Tokyo (JP)

(72) Inventors: Takashi Oniki, Utsunomiya (JP); Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 15/363,402

(22) Filed: Nov. 29, 2016

(65) Prior Publication Data

US 2017/0163885 A1   Jun. 8, 2017

(30) Foreign Application Priority Data

Dec. 2, 2015 (JP) .................. 2015-235443

(51) Int. Cl.
*H04N 5/228* (2006.01)
*H04N 5/232* (2006.01)
(Continued)

(52) U.S. Cl.
CPC ......... *H04N 5/23229* (2013.01); *G06T 5/003* (2013.01); *G06T 5/20* (2013.01)

(58) Field of Classification Search
CPC .................................................. H04N 5/23229
See application file for complete search history.

(56) References Cited

U.S. PATENT DOCUMENTS 9,007,482 B2   4/2015   Hatakeyama et al.
2010/0074520 A1   3/2010   Kinoshita
(Continued)

FOREIGN PATENT DOCUMENTS

JP   2010081263 A   4/2010
JP   201338563 A   2/2013
(Continued)

OTHER PUBLICATIONS

Berisha et al. "Estimation of Atmospheric PSF Parameters for Hyperspectral Imaging." Numerical Linear Algebra with Applications. 2015:1-20. Cited in Specification.
(Continued)

*Primary Examiner* — Gary C Vieaux
(74) *Attorney, Agent, or Firm* — Rossi, Kimms & McDowell LLP

(57) ABSTRACT

The image processing apparatus is configured to perform image processing on an input image produced by image capturing through an optical system. The apparatus includes a first distribution producer configured to produce a first distribution by using data for approximating a point spread function that corresponds to a condition relating to the image capturing, a second distribution producer configured to produce a second distribution by mirroring a part of the first distribution, a filter producer configured to produce, by using the second distribution, a first filter to be used for a sharpening process, and a processor configured to perform the sharpening process on the input image by using the first filter to produce a sharpened image.

11 Claims, 9 Drawing Sheets

(51) Int. Cl.
*G06T 5/00* (2006.01)
*G06T 5/20* (2006.01)

(56) References Cited

U.S. PATENT DOCUMENTS

| | | |
|---|---|---|
| 2011/0205402 A1 | 8/2011 | Kumar et al. |
| 2015/0097993 A1 | 4/2015 | Oniki et al. |
| 2015/0199795 A1 | 7/2015 | Naruse et al. |

FOREIGN PATENT DOCUMENTS

| | | |
|---|---|---|
| JP | 2015114740 A | 6/2015 |
| JP | 5779724 B2 | 9/2015 |
| WO | 2014048451 A1 | 4/2014 |

OTHER PUBLICATIONS

Berisha et al., "Estimation of atmospheric PSF parameters for hyperspectral imaging" Numerical Linear Algebra with Applications, vol. 22, No. 5, May 11, 2015 pp. 795-813, XP055361925. Cited in NPL 4.

Reichenbach et al., "Characterizing digital image acquisition devices", Optical Engineering, Soc. of Photo-Optical Instrumentation Engineers, vol. 30, No. 2, Feb. 1, 1991, pp. 170-177, XP000173777. Cited in NPL 4.

Mahajan, "Symmetry properties of aberrated point-spread functions", Journal of the Optical Society of America, vol. 11, No. 7, Jul. 1, 1994, XP001149370. Cited in NPL 4.

Extended European Search Report issued in European Patent Application No. 16002531.8 dated Apr. 20, 2017.

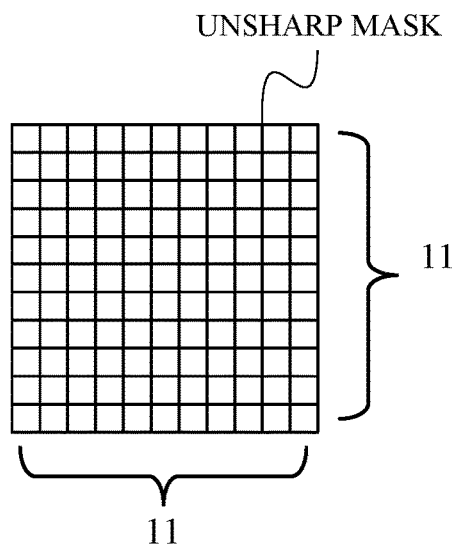
FIG. 7A
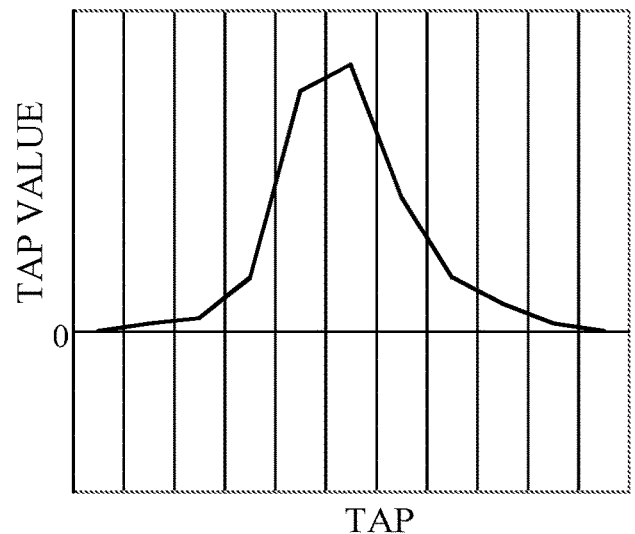
FIG. 7B
| G1 | B | G1 | B |
| --- | --- | --- | --- |
| R | G2 | R | G2 |
| G1 | B | G1 | B |
| R | G2 | R | G2 |
FIG. 8

IMAGE PROCESSING APPARATUS CONFIGURED TO SHARPEN IMAGE HAVING COMPLEX BLUR, IMAGE CAPTURING APPARATUS, IMAGE PROCESSING METHOD AND STORAGE MEDIUM STORING IMAGE PROCESSING PROGRAM

BACKGROUND OF THE INVENTION

Field of the Invention

The present invention relates to a technique for sharpening an image produced by image capturing.

Description of the Related Art

Image capturing through an optical system provides a captured image degraded with spread (blur) of a point image according to a point spread function (PSF) of the optical system.

On the other hand, an unsharp masking process is known that applies an unsharp mask to an input image as a captured image to produce an unsharpened image and that sharpens the input image by using a correction component obtained by adding or subtracting a difference between the unsharpened image and the input image to or from the input image. Such an unsharp masking process further sharpens an image area of the input image where the difference from the unsharpened image is larger.

However, a conventional unsharp masking process using a rotationally symmetric filter as an unsharp mask makes it difficult to sharpen a blurred image degraded due to a PSF having a complex shape such as asymmetric aberration and sagittal halo. That is, correcting a large aberration generated in an azimuth direction causes an undershoot in another azimuth direction in which a small aberration is generated, and reducing the undershoot makes it impossible to sufficiently correct the large aberration.

Japanese Patent Laid-Open No. 2010-081263 discloses a method that applies a one-dimensional asymmetric filter to a pixel signal row arranged in an image height direction (that is, in a meridional azimuth direction) to reduce an influence of a PSF.

Furthermore, in astrophysics, a Moffat function is used to fit a photometered astronomical body.

Sebastian Berisha, James Nagy, Robert J. Plemmons "Estimation of Atmospheric PSF Parameters for Hyperspectral Imaging" discloses a method of modeling a PSF by using an Elliptical Moffat function produced by ovalizing the Moffat function. Fitting a PSF of an optical system using such a function enabling approximating the PSF using coefficients.

However, the method disclosed in Japanese Patent Laid-Open No. 2010-081263 only takes account of an asymmetry in the image height direction and uses a one-dimensional correction filter, which cannot improve asymmetries in directions other than the image height direction. Furthermore, this method adjusts the asymmetry of the correction filter by the number of minus tap coefficients, so that its asymmetry in the image height direction does not meet blur caused by the PSF of the optical system, which cannot sufficiently sharpening the pixel signal row. Moreover, the Elliptical Moffat function disclosed in Sebastian Berisha, James Nagy, Robert J. Plemmons "Estimation of Atmospheric PSF Parameters for Hyperspectral Imaging" cannot reproduce complex shapes such as asymmetric aberration and sagittal halo of optical systems.

SUMMARY OF THE INVENTION

The present invention provides an image processing apparatus and others capable of sufficiently reproducing complex-shaped PSFs of optical systems and of reducing a data amount required for the reproduction.

The present invention provides as an aspect thereof an image processing apparatus configured to perform image processing on an input image produced by image capturing through an optical system. The apparatus includes a first distribution producer configured to produce a first distribution by using data for approximating a point spread function that corresponds to a condition relating to the image capturing, a second distribution producer configured to produce a second distribution by mirroring a part of the first distribution, a filter producer configured to produce, by using the second distribution, a first filter to be used for a sharpening process, and a processor configured to perform the sharpening process on the input image by using the first filter to produce a sharpened image.

The present invention provides as another aspect thereof an image capturing apparatus including an image sensor configured to perform image capturing for producing an input image, and the above image processing apparatus.

The present invention provides as yet another aspect thereof an image processing method to perform image processing on an input image produced by image capturing through an optical system. The method includes a step of producing a first distribution by using data for approximating a point spread function that corresponds to a condition relating to the image capturing, a step of producing a second distribution by mirroring a part of the first distribution, a step of producing by using the second distribution, a first filter to be used for a sharpening process, and a step of performing the sharpening process on the input image by using the first filter to produce a sharpened image.

The present invention provides as still another aspect thereof a non-transitory computer-readable storage medium storing a computer program to cause a computer to perform image processing on an input image produced by image capturing through an optical system. The image processing includes a process to produce a first distribution by using data for approximating a point spread function that corresponds to a condition relating to the image capturing, a process to produce a second distribution by mirroring a part of the first distribution, a process to produce, by using the second distribution, a first filter to be used for a sharpening process, and a process to perform the sharpening process on the input image by using the first filter to produce a sharpened image.

Further features and aspects of the present invention will become apparent from the following description of exemplary embodiments with reference to the attached drawings.

BRIEF DESCRIPTION OF THE DRAWINGS

FIGS. 7A and 7B are schematic and sectional views of the unsharp mask in each embodiment.

FIG. 8 schematically illustrates a Bayer arrangement.

DESCRIPTION OF THE EMBODIMENTS

Exemplary embodiments of the present invention will hereinafter be described with reference to the accompanying drawings.

Figure 3A:
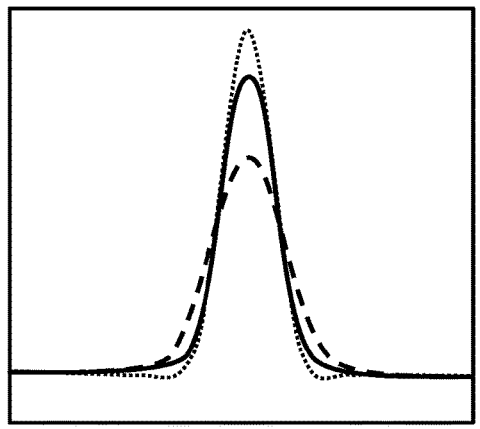
FIGS. 3A and 3B illustrate sharpening by an unsharp masking process in each embodiment.
Figure 3B:
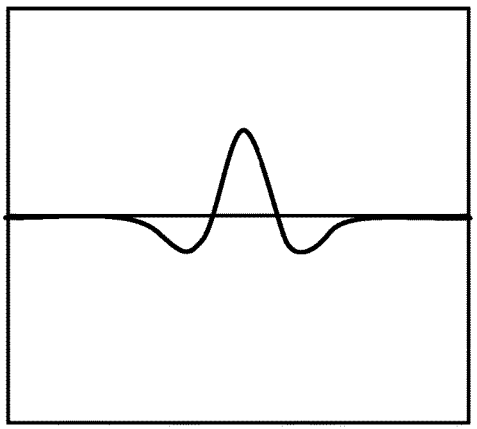

First, prior to description of specific embodiments, description will be made of features common to these embodiments. FIGS. 3A and 3B schematically illustrate a sharpening process as an unsharp masking process in each embodiment. In each of these drawings, a horizontal axis indicates coordinates, and a vertical axis indicates pixel values or luminance values. In FIG. 3A, a solid line indicates an input image (captured image) produced by image capturing through an image capturing optical system, a broken line indicates an unsharpened image produced by unsharpening the input image using an unsharp mask, and a dotted line indicates a sharpened image after sharpening. In FIG. 3B, a solid line indicates a correction component that corresponds to a difference between the input image and the unsharpened image. FIGS. 3A and 3B illustrate sections in an x direction in FIGS. 4A and 4B described later.

When $f(x,y)$ represents the input image and $h(x,y)$ represents the correction component, the sharpened image $g(x,y)$ is expressed by following expression (1).

$$g(x,y)=f(x,y)+m \times h(x,y) \qquad (1)$$

In expression (1), m represents an adjustment coefficient for changing a correction strength. Changing the value of the adjustment coefficient m enables adjusting a correction amount. The adjustment coefficient m may be fixed regardless of positions in the input image or may be changed so as to be expressed as $m(x,y)$ depending on the positions in the input image. The adjustment coefficient m changed depending on the positions in the input image enables adjusting the correction amount depending on the positions. The adjustment coefficient m may be changed depending on image capturing conditions set at the image capturing such as a focal length and an F-number of the image capturing optical system and an image capturing distance (or an object distance).

The correction component $h(x,y)$ is expressed by following expression (2) where $USM(x,y)$ represents the unsharp mask.

$$h(x,y)=f(x,y)-f(x,y)*USM(x,y) \qquad (2)$$

The symbol * represents convolution, and $USM(x,y)$ indicates, for example, a tap value at coordinates $(x,y)$.

Transforming the right side of expression (2) gives following expression (3).

$$h(x,y)=f(x,y)*(\delta(x,y)-USM(x,y)) \qquad (3)$$

In expression (3), δ represents a delta function. The delta function is expressed as a filter whose number of taps is equal to that of $USM(x,y)$ and whose center tap value is 1 and other tap values are 0; the filter (second filter) is produced on a basis of an ideal point image.

Transforming expression (2) enables expressing expression (3), so that expression (2) is equivalent to expression (3). Thus, description will hereinafter be made of production of the correction component by using expression (2).

Expression (2) takes difference between the input image $f(x,y)$ and the unsharpened image produced by unsharpening the input image $f(x,y)$ using the unsharp mask and produces the correction component $h(x,y)$ on a basis of the difference. A typical unsharp masking process uses as the unsharp mask a smoothing filter such as a Gaussian filter, a median filter and a moving-average filter. For example, using the Gaussian filter as the unsharp mask for the input image $f(x,y)$ illustrated by the solid line in FIG. 3A provides the unsharpened image, which is produced by unsharpening the input image $f(x,y)$, as illustrated by the broken line in FIG. 3A. The correction component $h(x,y)$ corresponds to the difference between the input image $f(x,y)$ and the unsharpened image as expressed by expression (2), so that subtracting the broken line from the solid line in FIG. 3A provides a component expressed by the solid line in FIG. 3B.

Performing the calculation of expression (1) using the correction component calculated as described above enables sharpening the input image $f(x,y)$ illustrated by the solid line in FIG. 3A to produce the sharpened image illustrated by the dotted line therein.

Next, description will be made of a case of sharpening a captured image degraded through the image capturing optical system by the unsharp masking process.

The captured image (input image) $f(x,y)$ acquired through the image capturing optical system is expressed by following expression (4) where $I(x,y)$ represents an original image (object) to be captured and $psf(x,y)$ represents a point spread function PSF that is a function expressing a response of the image capturing optical system to a point light source.

$$f(x,y)=I(x,y)*psf(x,y) \qquad (4)$$

When the image capturing optical system is a rotationally symmetric coaxial optical system, a PSF corresponding to a central part of the captured image has a rotationally symmetric shape. Therefore, applying a rotationally symmetric unsharp mask USM to the central part of the captured image enables sharpening the captured image $f(x,y)$ to provide a sharpened image close to the original image $I(x,y)$. This process provides a correction amount corresponding to a difference value between the captured image and an unsharpened captured image unsharpened by the unsharp mask. Therefore, in order to accurately sharpening (correcting) the captured image, it is more desirable to use, as the unsharp mask, not a simple smoothing filter, but a mask whose shape is closer to that of $psf(x,y)$. For example, in a case where the captured image is degraded due to influence of spherical aberration, though the spherical aberration rotationally symmetrically influences the captured image, a smoothing filter such as the Gaussian filter has a distribution shape different from that of a PSF corresponding to the spherical aberration. Therefore, even when reducing such influence of rotationally symmetric blurring, using the PSF of the image capturing optical system enables more accurately correcting the captured image.

Each embodiment uses the PSF for producing the unsharp mask $USM(x,y)$. Although the captured image $f(x,y)$ illustrated in FIG. 3A simply has a symmetric (rotationally symmetric) shape, the captured image may have other shapes than such a symmetric shape. Even when the original image I(x,y) has an asymmetric (non-rotationally symmetric) shape, as long as a degradation function that indicates a degradation corresponding to psf(x,y) and affecting the original image I(x,y) is rotationally symmetric, using the rotationally symmetric unsharp mask enables sharpening the captured image.

Figure 4A:
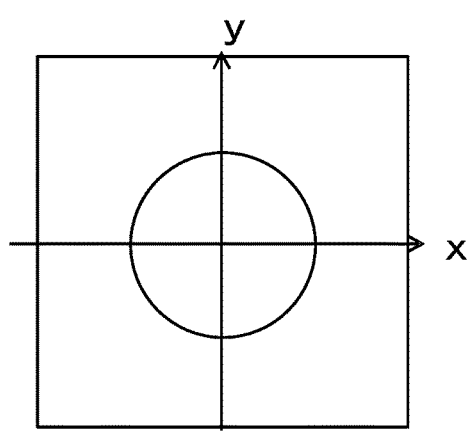
FIGS. 4A and 4B schematically illustrate PSFs of image capturing optical systems in each embodiment.
Figure 4B:
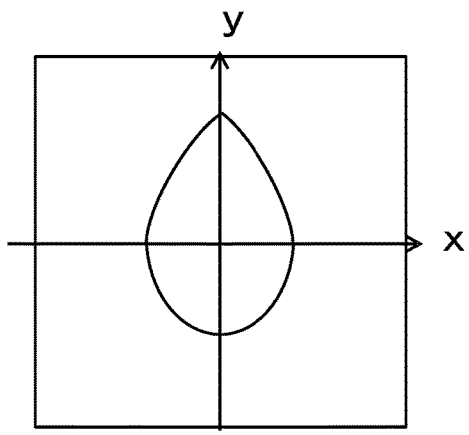

On the other hand, even when the image capturing optical system is a rotationally symmetric coaxial optical system, the PSF has a non-rotationally symmetric shape in a peripheral part of the captured image other than the central part thereof. FIGS. 4A and 4B illustrate an example of the PSF of the image capturing optical system in an x-y plane. The x direction corresponds to a horizontal direction, and a y direction corresponds to a vertical direction. FIG. 4A illustrates an on-axis (central) PSF, and FIG. 4B illustrates an off-axis (peripheral) PSF. For instance, when the original image (object) is an ideal point image, the captured image f(x,y) corresponds to the PSF of the image capturing optical system as expressed by expression (4). When the ideal point image is present at a peripheral field angle corresponding to FIG. 4B, and therefore the original image is degraded due to the influence of the PSF of the image capturing optical system, the captured image becomes an asymmetrically blurred image as illustrated in FIG. 4B. Description will be made of a case of performing sharpening by the unsharp masking process on such an asymmetrically blurred image.

Figure 5A:
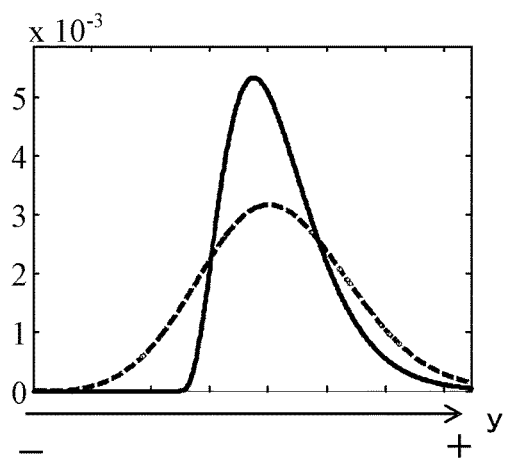
FIGS. 5A to 5C schematically illustrate sharpening using a rotationally symmetric unsharp mask in each embodiment.
Figure 5B:
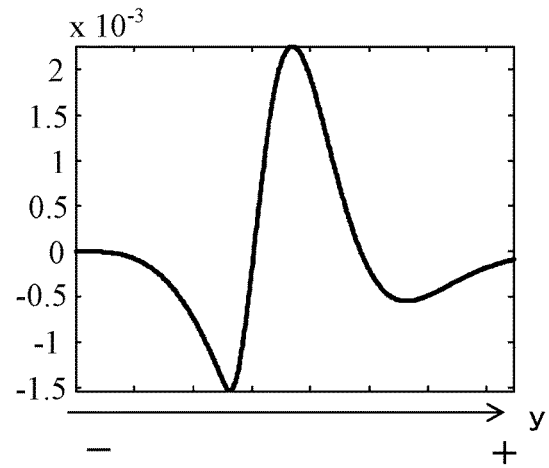
Figure 5C:
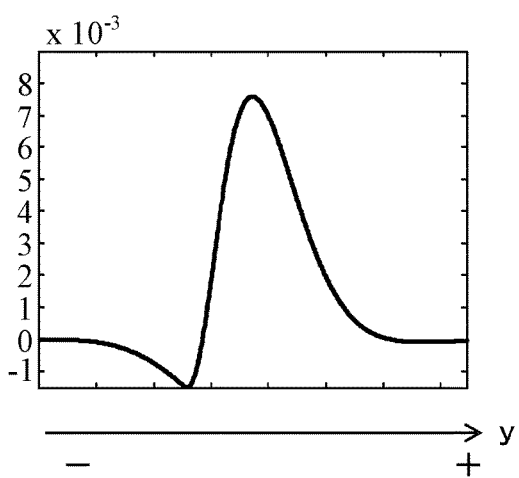
Figure 6A:
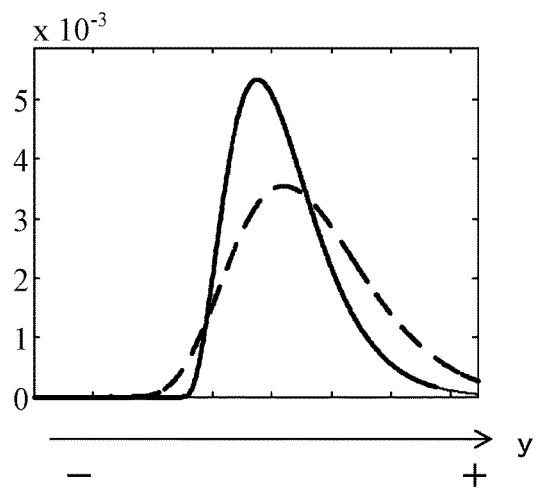
FIGS. 6A to 6C schematically illustrate sharpening using a non-rotationally symmetric unsharp mask in each embodiment.
Figure 6B:
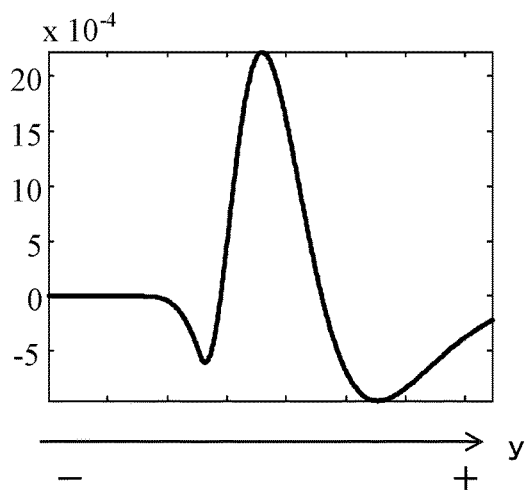
Figure 6C:
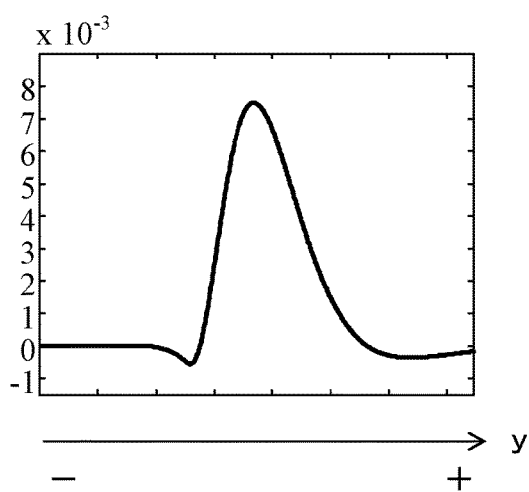

FIGS. 5A to 5C and 6A to 6C illustrate examples of unsharp masking processes performed on an asymmetrically degraded (blurred) captured image. FIGS. 5A to 5C illustrate a case of performing the process using a rotationally symmetric unsharp mask, and FIGS. 6A to 6C illustrate a case of performing the process using a rotationally asymmetric unsharp mask. Horizontal and vertical axes in these drawings respectively indicate coordinates and pixel values or luminance values as in FIGS. 3A and 3B.

In each of FIGS. 5A and 6A, a solid line indicates a section of the asymmetrically blurred captured image in the y direction illustrated in FIG. 4B, and a dotted line indicates the same section of an unsharpened image unsharpened by the unsharp mask. A side on which the captured image is blurred due to the PSF of the image capturing optical system and thus its bottom is spread is hereinafter referred to as "a plus side" in the y direction. In FIG. 5A, as the rotationally symmetric unsharp mask, the Gaussian filter is used. On the other hand, in FIG. 6A, as the rotationally asymmetric unsharp mask, the PSF of the image capturing optical system is used.

In each of FIGS. 5B and 6B, a solid line indicates a correction component that is a difference between the unsharpened image unsharpened by the unsharp mask and the captured image. In FIG. 5A, the difference between the unsharpened image and the captured image is small on the plus side with respect to a peak position of the solid line and is large on a minus side with respect thereto. Thus, the correction component illustrated in FIG. 5B has a smaller extreme value on the minus side than on the plus side with respect to a center peak position.

As can be understood from a comparison between FIGS. 5A and 5B, a correction amount that is an amount of the correction component is small on the plus side and is large on the minus side on which the bottom of the captured image is spread. For this reason, performing the sharpening according to expression (4) with such a correction component cannot sufficiently correct the asymmetric (non-rotationally symmetric) blur. A solid line in FIG. 5C indicates a sharpened image as a result of the sharpening when the adjustment coefficient m is 1. FIG. 5C shows that, though the sharpened image is more sharpened than the solid line (captured image) in FIG. 5A, the asymmetric blur is not corrected because the solid line in FIG. 5C is more significantly concave on the minus side than on the plus side.

Description will be made of a case of adjusting the correction amount by changing the adjustment coefficient m in expression (1), without changing the unsharp mask. Setting the value of the adjustment coefficient m to be large in order to sufficiently correct a plus side part of the captured image results in an excessive correction (undershoot) in a minus side part of the captured image. Conversely, setting the value of the adjustment coefficient m so as to make the correction amount of the minus side part of the captured image appropriate causes an insufficient correction in the plus side part of the captured image.

As just described, performing the unsharp masking process on the non-rotationally symmetrically blurred image by using the rotationally symmetric unsharp mask makes it difficult to reduce the asymmetry of the captured image so as to sharpen the captured image. Such a problem is also caused when a rotationally symmetric filter other than the Gaussian filter is used as the rotationally symmetric unsharp mask.

On the other hand, in FIG. 6A, the difference value between the unsharpened image whose plus side part is more unsharpened and the captured image is large on the plus side with respect to a peak position of the solid line and is small on the minus side, which is an inverse relation to that in FIG. 5A. Consequently, the correction component illustrated in FIG. 6B has a smaller extreme value on the plus side than on the minus side with respect to its center peak position. Applying this correction component to the captured image illustrated by the solid line in FIG. 6A makes the correction amount large on the plus side with respect to the peak position on which the captured image is more blurred and makes the correction amount small on the minus side on which the captured image is less blurred. When such a non-rotationally symmetric unsharp mask is used, a balance between levels of the blur of the captured image (input image) on the plus side and the minus side coincides with a balance between the correction amounts of the correction component on the plus side and the minus side. This coincidence reduces excess and insufficiency in the correction, which are problems in the case of using the rotationally symmetric unsharp mask.

FIG. 6C illustrates a sharpened image as a result of the sharpening when the adjustment coefficient m is 1. The sharpened image is more sharpened than the solid line (captured image) in FIG. 6A, and the concave shape on the minus side with respect to the shape on the plus side, which is noticeable in FIG. 5C, is reduced. Furthermore, since this sharpening results in a less excess correction compared to the case of using the rotationally symmetric unsharp mask, the value of the adjustment coefficient m in expression (1) can be set to be relatively large, which enables further sharpening the captured image while reducing its asymmetry.

Additionally, the correction amount of the correction component corresponds to the difference between the unsharpened image and the captured image. Therefore, in order to perform the correction with higher accuracy, it is necessary that a part of the captured image largely blurred due to the PSF of the image capturing optical system be unsharpened by the unsharp mask more than other part thereof. Thus, in order to perform the correction with higher accuracy, it is ideal to use, as the unsharp mask, the PSF of the image capturing optical system.

Next, description will be made of coefficients used for producing the unsharp mask USM. Each embodiment uses, as described above, the PSF of the image capturing optical system as the unsharp mask. The PSF of the image capturing optical system varies depending on image capturing conditions (partially mentioned above) such as an image height, the focal length, the F-number and the image capturing distance (i.e., a distance from an object to be focused). Therefore, when performing the sharpening, it is necessary to produce the unsharp mask appropriate for the image capturing conditions. A method may be employed that, in order to change the unsharp mask according to the PSF varying depending on the image capturing conditions, calculates the PSFs for all of mutually different image capturing conditions and selects a suitable one of the PSFs as the unsharp mask. This method, however, decreases a processing speed when applying the unsharp mask to the captured image and requires a vast storage amount for holding (storing) data on all the calculated PSFs, which is undesirable.

Thus, each embodiment stores data on coefficients for approximating the PSF of the image capturing optical system and reconstructs (approximates) the PSF by using the data on the coefficients in the production of the unsharp mask. This method enables maximizing the effect of the sharpening while reducing an amount of the data to be held. Each embodiment uses, as the method of producing the unsharp mask by approximating the PSF, a continuous function and data on coefficients contained therein.

First, description will be made of the continuous function used for approximating the PSF of the image capturing optical system. As described above, in astrophysics, a function $P(x,y)$ expressed by following expression (5), which is called a Moffat function, is often used to fit a photometered astronomical body.

$$P(x, y) = \left(1 + \frac{x^2 + y^2}{\alpha^2}\right)^{-\beta} \quad (5)$$

In expression (5), $\alpha$ and $\beta$ are coefficients. When $\beta=1$, the function is called a Lorenz function. When modeling the PSF by using expression (5), fitting the function of expression (5) to a measured or calculated distribution of the PSF enables calculating these coefficients $\alpha$ and $\beta$. Then, using the calculated coefficients $\alpha$ and $\beta$ and expression (5) enables modeling the PSF. Although using expression (5) enables producing an approximated PSF, the function of expression (5) is a function that can express only a rotationally symmetric distribution, so that it is impossible to produce a non-rotationally symmetric distribution using expression (5).

A function expressed by following expression (6) (and expression (6a)) is provided that is obtained by transforming expression (5) and capable of expressing a non-rotationally symmetric elliptical shape. This function is called an Elliptical Moffat function.

$$P(x, y) = \left[1 + \frac{1}{\alpha^2}\left(X^2 + \frac{Y^2}{\gamma^2}\right)\right]^{-\beta} \quad (6)$$

$$\begin{bmatrix} X \\ Y \end{bmatrix} = \begin{bmatrix} \cos\theta & \sin\theta \\ -\sin\theta & \cos\theta \end{bmatrix} \begin{bmatrix} x \\ y \end{bmatrix} \quad (6a)$$

In expression (6), $\alpha$, $\beta$ and $\gamma$ are coefficients. Expression (6a) expresses a rotation matrix of an angle $\theta$. Combining expressions (6) and (6a) provides following expression (7).

$$P(x,y)=(\sigma+ax^2+2bxy+cy^2)^{-\beta} \quad (7)$$

In expression (7), a, b, c, $\alpha$ and $\beta$, are coefficients. In order to maintain the elliptical shape when using expression (7), it is necessary that the coefficients a, b and c satisfy a relation of $b^2-ac<0$.

Using this expression (7) (or expression (6)) enables reproducing an elliptical-shaped distribution that cannot be expressed by expression (5), which improves the accuracy of the correction as compared to when using expression (5). However, even when using expression (7) for the fitting to the PSF of the image capturing optical system, it is impossible to reproduce complex shapes such as asymmetric aberration and sagittal halo of the image capturing optical system.

Thus, each embodiment uses a function expressed by following expressions (8) ((8a), (8b) and (8c)) as functions capable of reproducing such complex shapes such as the asymmetric aberration and the sagittal halo.

When $x \geq 0$ and $y \geq 0$, $$P(x,y)=(\sigma+ax^2+2bxy+cy^2)^{-\beta}-e \quad (8a)$$

when $x \geq 0$ and $y<0$, $$P(x,y)=(\sigma+ax^2+2bdxy+cd^2y^2)^{-\beta}-e \quad (8b),$$

and when $x<0$, $$P(x,y)=P(-x,y). \quad (8c)$$

In expressions (8), a, b, c, d, e, $\sigma$ and $\beta$ are coefficients. It is necessary that the coefficients a, b and c in expressions (8) satisfy the relation of $b^2-ac<0$ as in expression (7).

Figure 9C:
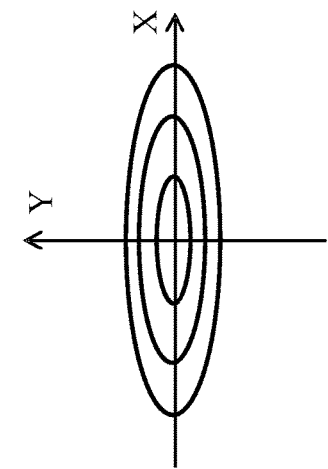
FIGS. 9A to 9F are contour diagrams of distributions expressible by functions in each embodiment.
Figure 9B:
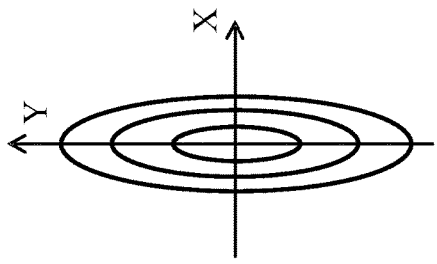
Figure 9A:
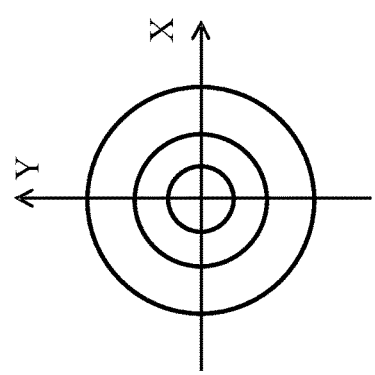

FIG. 9A to 9F illustrate examples of distribution shapes expressible by functions based on expressions (8). FIG. 9A illustrates a rotationally symmetric distribution in an X-Y coordinate system; the distribution shape is expressible by any functions of expressions (5) to (8). When the image capturing optical system is a coaxial optical system and an image point is located on its optical axis, the PSF has a rotationally symmetric shape, so that the distribution shape of FIG. 9A is expressible by any functions of expressions (5) to (8).

FIGS. 9B and 9C illustrate elliptical-shaped distributions (each hereinafter referred to as "an elliptical distribution") whose long and short axes overlap X and Y axes. These elliptical distributions are not expressible by the function of expression (5) and can be approximated by any functions of expressions (6) to (8) with improved accuracy.

Figure 9F:
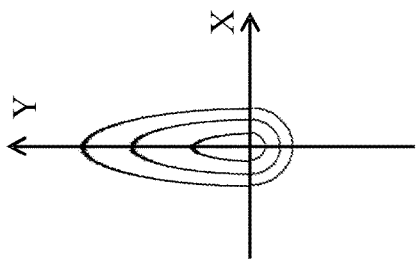
Figure 9E:
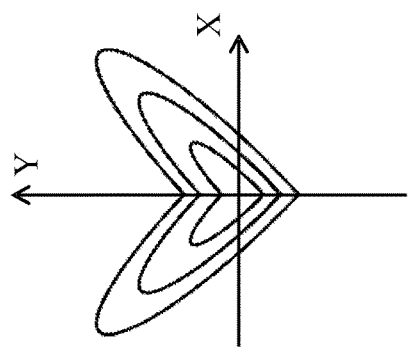
Figure 9D:
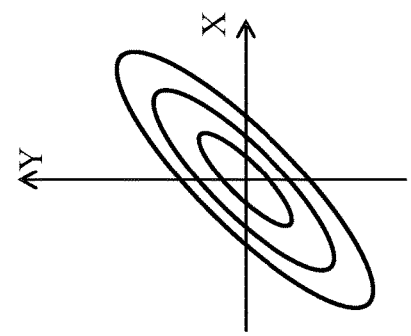

FIG. 9D illustrates an elliptical distribution whose long and short axes do not overlap the X and Y axes. This elliptical distribution is not expressible by the functions of expressions (5) and (6) and can be approximated by any functions of expressions (7) and (8) with sufficient accuracy.

FIGS. 9E and 9F illustrate distribution shapes symmetric about the Y axis (i.e., in a Y direction) and asymmetric about the X axis (i.e., in an X direction). The distribution of FIG. 9E corresponds to one obtained by mirroring a +X side part of the elliptical distribution of FIG. 9D located on a +X side further than the Y axis, about the Y axis to a −X side. The distribution shape of FIG. 9F corresponds to one obtained by mirroring, of an elliptical distribution whose long axis overlap the Y axis and whose short axis does not overlap the X axis, an upper part from the X axis about the Y axis and by providing to a lower part thereof from the X axis a concentric semi-circle shape.

The functions of expressions (5) to (7) cannot express the line-symmetric distribution shapes illustrated in FIGS. 9E and 9F. On the other hand, the function of expression (8) used in each embodiment can approximate the distribution shapes illustrated in FIGS. 9E and 9F with sufficient accuracy.

Although the PSF at the image point on the optical axis of the image capturing optical system has the rotationally symmetric distribution shape as described above, PSFs at image points not located on the optical axis in a plane (image surface) orthogonal to the optical axis do not necessarily have such a rotationally symmetric distribution shape. However, when the image capturing optical system is a coaxial optical system, even the PSF at the image point not located on the optical axis has a rotationally symmetric distribution shape in a direction (sagittal direction) orthogonal to a direction (meridional direction) in which a straight line connecting that image point and the optical axis extends in the image surface. As just described, although the PSF of the image capturing optical system does not necessarily have a rotationally symmetric distribution shape, it has a symmetric distribution shape in the sagittal direction. Therefore, matching an x direction in expression (8) (i.e., the X direction in FIGS. 9E and 9F) to the sagittal direction and matching a y direction (i.e., the Y direction in FIGS. 9E and 9F) to the meridional direction enables correcting the complex asymmetric aberration.

Next, a detailed description will be made of the coefficients in expression (8). Among the coefficients in expression (8), a, b and c are coefficients used for producing the elliptical distribution whose long and short axes do not overlap the X and Y axes as illustrated in FIG. 9D.

Controlling these coefficients a, b and c enables controlling the asymmetries of the elliptical distribution in the X and Y directions. Furthermore, as illustrated in FIGS. 9E and 9F controlling the coefficients a, b and c enables expressing aberration difficult to be expressed by other functions, such as the sagittal halo in which an elliptical distribution whose at least one of the long and short axes does not overlap the X and Y axes is symmetrized only about the Y axis.

The coefficient d is one for asymmetrizing the elliptical distribution in the Y direction (specific direction). Controlling this coefficient d enables correcting aberration having an asymmetric shape in the meridional direction. For example, controlling the coefficient d enables approximating comatic aberration with improved accuracy.

The coefficients e, σ and β are ones for controlling the spread of the elliptical distribution. Increasing the coefficient σ when the spread of the approximated elliptical distribution shape is large and increasing the coefficient β when the approximated elliptical distribution shape significantly changes near its peak enables improve approximation accuracy. The coefficient e is one for restricting the spread of the elliptical distribution. When the coefficient e is 0, from expression (8), the elliptical distribution gradually approaches to P(x,y)=0 in the peripheral part.

Therefore, when the spread of the elliptical distribution is small, making the coefficient e larger than 0 (e>0) enables improving the approximation accuracy.

In order to approximate the PSF of the image capturing optical system, it is necessary that the elliptical distribution satisfy P(x,y)≥0. Therefore, when e>0, P(x,y)<0 in the peripheral part. However, in this case, P(x,y) may be clipped at 0 (i.e., P(x,y)=0).

Next, description will be made of basic expressions of the unsharp masking processes in Embodiments 1 to 3. In a third embodiment (Embodiment 3), the sharpening is performed using following expression (11) derived from expressions (1) and (2).

$$g(x,y)=f(x,y)+m\times[f(x,y)-f(x,y)*USM(x,y)] \quad (11)$$

In a second embodiment (Embodiment 2), the sharpening is performed using following expression (12) derived from expressions (1) and (3).

$$g(x,y)=f(x,y)+m\times f(x,y)*[\delta(x,y)-USM(x,y)] \quad (12)$$

In a first embodiment (Embodiment 1), the sharpening is performed using following expression (13) obtained by further transforming expression (12).

$$g(x,y)=f(x,y)*[\delta(x,y)+m\times(\delta(x,y)-USM(x,y))] \quad (13)$$

As described above, the PSF varies depending on the image capturing conditions such as the image height (of an object image formed by the image capturing optical system), the focal length and the F-number of the image capturing optical system and the image capturing distance. Although each embodiment described below takes account of the image height as the image capturing condition as an example, alternative embodiments may obtain aberration information varying depending on the focal length, the F-number and the image capturing distance and produce the unsharp mask based thereon.

Embodiment 1

Figure 2:
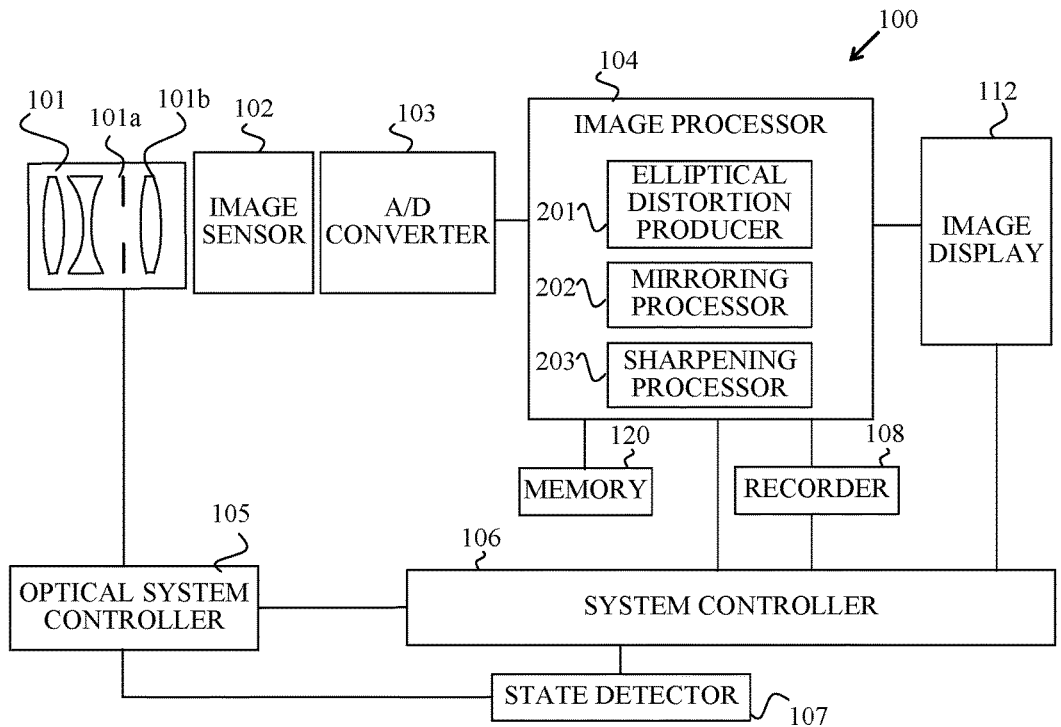
FIG. 2 is a block diagram illustrating a configuration of an image capturing apparatus of each embodiment.

FIG. 2 illustrates a configuration of an image capturing apparatus 100 that is Embodiment 1. The image capturing apparatus 100 is provided with a memory 120 in which an image processing program is installed. The image processing program is a computer program to cause an image processor (image processing apparatus) 104 to perform a sharpening process (unsharp masking process) on a captured image as an input image. The image processor 104 may include a memory in which the image processing program is installed or may include a circuit designed so as to operate to perform the sharpening process.

The memory 120 is constituted by a ROM, a hard disk or the like. The memory 120 may also serve as a recorder 108 described later.

The image capturing apparatus 100 includes an image capturing optical system 101 and a camera body (not illustrated). The image capturing optical system 101 includes an aperture stop 101a and a focus lens 101b. The image capturing optical system 101 is provided integrally with or detachably attachable to the camera body.

An image sensor 102 is constituted by a two-dimensional photoelectric conversion element such as a CCD (Charge Coupled Device) sensor or a CMOS(Complementary Metal-Oxide Semiconductor) sensor. The image sensor 102 captures (photoelectrically converts) an object image (imaging light) formed by the image capturing optical system 101 to output an analog image capturing signal. The analog image capturing signal is converted into a digital image capturing signal by an A/D converter 103, and the digital image capturing signal is input to the image processor 104.

The image processor 104 performs predetermined processes on the digital image capturing signal to produce the captured image and performs the sharpening process on the captured image. Although in this embodiment the image processor 104 built in the image capturing apparatus 100 performs the sharpening process, an image processing apparatus such as a personal computer (PC), which is separate from the image capturing apparatus, may perform the sharpening process.

The image processor 104 acquires information on image capturing conditions from a state detector 107. The image capturing conditions include, as described above, the focal length and the F-number of the image capturing optical system 101 and the image capturing distance (or the object distance). The state detector 107 acquires the information on the image capturing conditions directly from a system controller 106 and may acquire the information on the image capturing conditions relating to the image capturing optical system 101 from an optical system controller 105.

The image processor 104 includes an elliptical distribution producer (as a first distribution producer) 201, a mirroring processor (as a second distribution producer) 202 and a sharpening processor (as a filter producer and a processor) 203. Processes performed by the image processor 104 will be described later. A sharpened image as an output image produced by the sharpening process performed by the image processor 104 is stored in the recorder 108 in a predetermined format.

The memory 120 stores (holds), in addition to the above-mentioned image processing program, information indicating a relation between the image capturing conditions of the image capturing optical system 101 and the PSFs of the image capturing optical system 101. The coefficients a, b, c, d, e, σ and β in expression (8), which are used for fitting (approximation) of the PSF in the sharpening process, are calculated beforehand by a coefficient calculator (described later). Data of these coefficients (the data is hereinafter referred to as "coefficient data") is held by the memory 120.

An image display 112 is configured to display the captured image and the sharpened image.

The above-described operations and processes are controlled by the system controller 106. The system controller 106 is constituted by a microcomputer including a CPU, a memory and others. The optical system controller 105 controls, in response to instructions from the system controller 106, mechanical drive of the image capturing optical system 101.

The image capturing optical system 101 may include optical elements such as a low-pass filter and an infrared-cutting filter. When using an optical element such as the low-pass filter influencing the PSF, taking account of the influence of this optical element in producing the unsharp mask enables performing the sharpening process with higher accuracy. Using the infrared cutting filter influences PSFs of RGB channels (RGB color components), especially the PSF of the R channel, so that it is desirable to take account of that influence in producing the unsharp mask.

Figure 10:
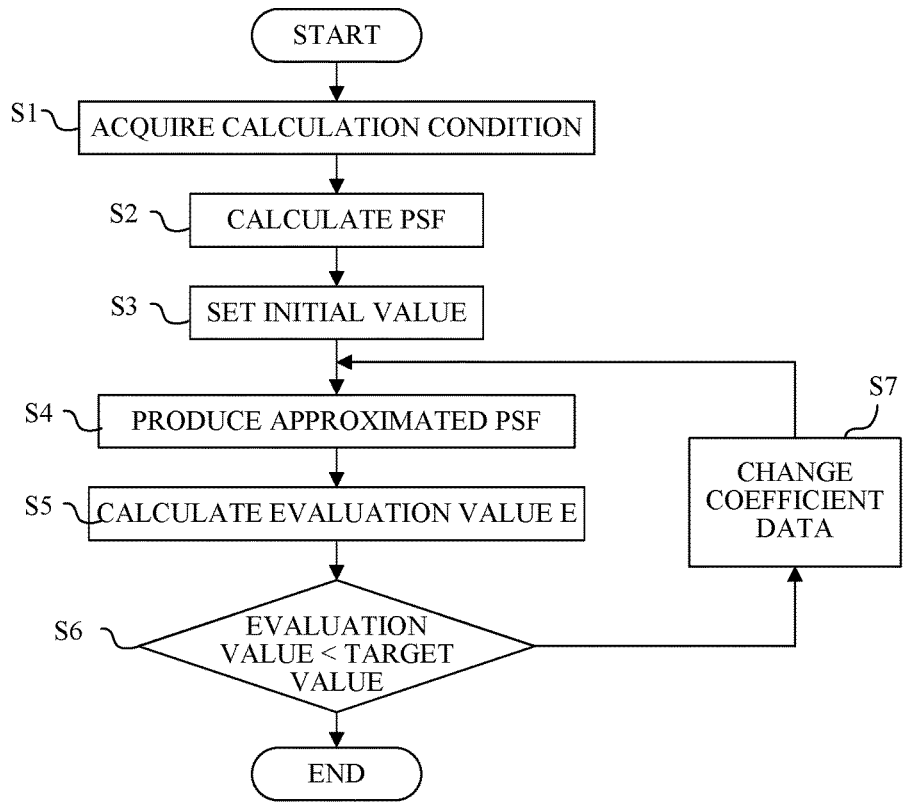
FIG. 10 is a flowchart illustrating a coefficient calculation process in each embodiment.

Next, description will be made of a coefficient calculation process performed by the coefficient calculator with referring to a flowchart of FIG. 10. In FIG. 10, symbol S indicates a step. This also applies to another flowchart described later. The coefficient calculator calculates the coefficients used for producing the unsharp mask by using a design value of the image capturing optical system 101.

First at step S1, the coefficient calculator acquires information necessary to calculate the coefficients. Specifically, the coefficient calculator acquires image capturing conditions at image capturing for producing a captured image for which the coefficients are calculated and acquires a target value in approximating the PSF.

Figure 11:
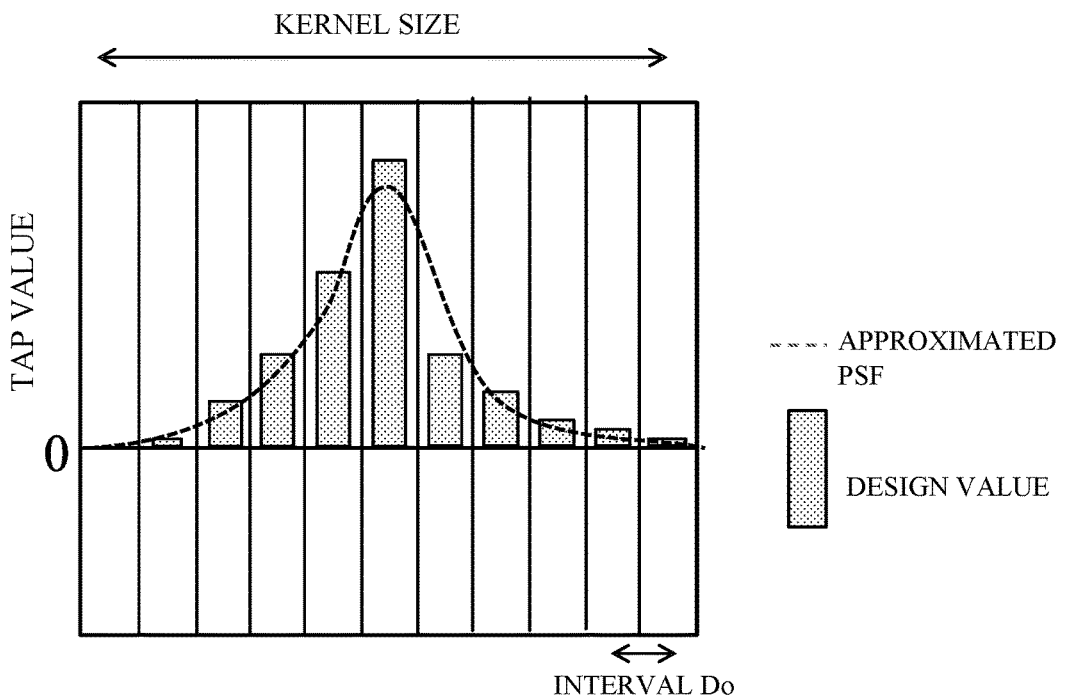
FIG. 11 illustrates a relation of the approximated PSFs and design values in each embodiment.

Next at step S2, the coefficient calculator calculates, from data of the design value of the image capturing optical system 101 corresponding to the image capturing condition acquired at step S1, the PSF (hereinafter referred to as "a design PSF") of the image capturing optical system 101. FIG. 11 illustrates a section of the design PSF calculated at step S2 and a section of an approximated PSF produced at step S4 described later. As illustrated in FIG. 11, the design PSF calculated at step S2 is discretized with a number of division (tap number) of N and intervals Do. A size of the design PSF (kernel size) is expressed by, as clear from FIG. 11, a product of the interval Do and the tap number N. That is, in the discretized design PSF, known two of the interval Do, the tap number and the kernel size uniquely provides a remaining one. For example, when the interval Do is 2.0 μm and the tap number is 11, the kernel size Dox(N−1) is 20 μm. DoxN may be called the kernel size. In this case, the kernel size DoxN is 22 μm. The interval Do becomes a pitch in the fitting, so that it is desirable that the interval Do be smaller than pixel pitches of existing image sensors. The fitting using such a smaller pixel pitch in the fitting is usable for image sensors having various pixel pitches.

Although this embodiment uses, in the fitting, the data of the design value of the image capturing optical system 101, data of estimated PSF of the image capturing optical system obtained by an estimation using a captured image of a chart or the like.

Next at step S3, the coefficient calculator sets initial values of the coefficients a, b, c, d, e, σ and β used for approximating the PSF. Since the coefficients are updated at subsequent processes, the coefficient calculator sets at step S3 tentative values as the initial values.

Next at step S4, the coefficient calculator substitutes the set coefficients in expression (8), that is, approximates the PSF to produce the approximated PSF. This coefficient calculation process derives optimum coefficients by fitting of the design value and therefore discretizes the approximated PSF. A number of division and intervals in the discretization are the same as those of the design PSF calculated at step S2.

Next at step S5, the coefficient calculator evaluates a difference between the design PSF calculated at step S2 and the approximated PSF produced at step S4. In the estimation of the difference between the design PSF and the approximated PSF, the coefficient calculator calculates a square-mean-root value of the difference between the design and approximated PSFs to use a calculation result as an evaluation value E. A smaller evaluation value E means that the approximated PSF is closer to the design PSF.

Next at step S6, the coefficient calculator performs a determination using the evaluation value E calculated at step S5 and the target value acquired at step S1. The evaluation value E may include not only information on the difference between the design and approximated PSFs, but also information on the coefficients in the approximated PSF. This embodiment uses expression (8) as the function (model) for approximating the PSF, so that it is necessary that, as described above, the coefficients a, b and c satisfy the relation of $b^2-ac<0$. Therefore, when the coefficients a, b and c do not satisfy this condition, this, have a relation of $b^2-ac\geq0$, a desirable result is not obtained. In such a case, calculating the evaluation value E such that the evaluation value E increases as a positive value of $b^2-ac$ increases enables efficiently performing the fitting.

Furthermore, when each coefficient has a limit range where that coefficient can be set, changing the evaluation value E as above can improve efficiency and accuracy of the fitting.

At this step, the coefficient calculator compares the evaluation value E thus calculated with the preset target value. When the evaluation value E is equal to or less than the target value, the coefficient calculator ends the fitting, i.e., the production of the approximated PSF to output data of the coefficients with which the approximated PSF has been produced. When the evaluation value E is larger than the target value, since the fitting is insufficient, the coefficient calculator proceeds to step S7.

At step S7, the coefficient calculator changes (updates) one or more of the coefficients. After changing the one or more coefficients, the coefficient calculator returns to step S4 to calculate the approximated PSF again and then calculates the evaluation value E at step S5. Then, at step S6, the coefficient calculator repeats the processes from step S4 to step S7 until the evaluation value E becomes equal to or smaller than the target value.

When the evaluation value E after the update of the coefficients does not become smaller than that before the update, the coefficient calculator may use the evaluation value E before the update to perform the processes from step S4 again or may return to step S3 in order to move out from a local solution and set the initial values again.

The above-described coefficient calculation process enables holding in the memory 120 the data of the coefficients of the approximated PSF calculated beforehand for various image capturing optical system 101 (when they are interchangeable) and for various image capturing conditions. Calculating beforehand and holding the coefficients of the approximated PSF enables, only by acquiring the data of the calculated coefficients in the sharpening process, reconstructing (reproducing) the approximated PSF appropriated for the image capturing optical system 101 and the image capturing condition at the image capturing.

Figure 1:
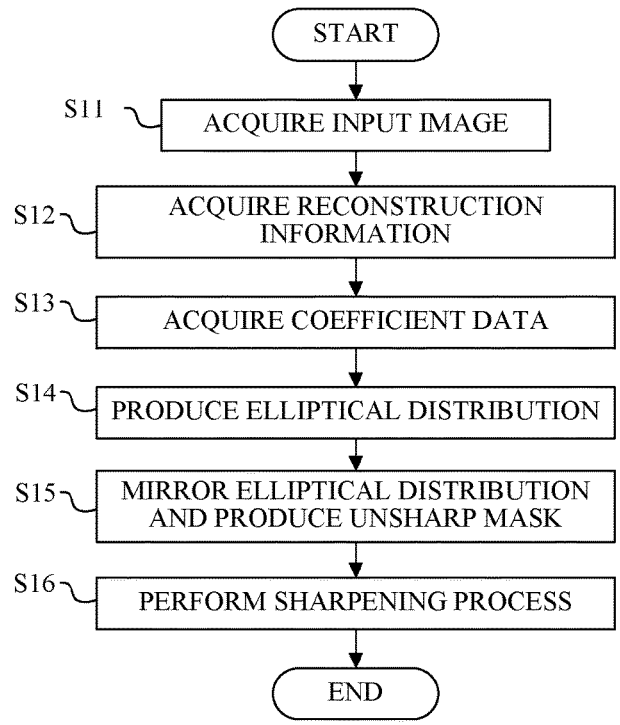
FIG. 1 is a flowchart illustrating an image process (sharpening process) in Embodiments 1 to 3 of the present invention.

Next, with referring to a flowchart of FIG. 1, description will be made of the sharpening process performed by the image processor 104. The sharpening process illustrated in this flowchart includes a preprocess (steps S11 to S13) and a main process (step S14 to S16); the actual sharpening process as the unsharp masking process is performed in the main process.

First at step S11, the image processor 104 acquires the captured image as the input image. The input image is, for example, a G-channel image data after demosaicing. Alternatively, as the input data, R-channel image data, B-channel image data, full-RGB-channel image data or image data before demosaicing may be used.

FIG. 8 illustrates the full-RGB-channel image data. In the illustrated image data, data of R, G1, G2 and B channels are arranged in a Bayer arrangement.

For example, simply extracting the G1-channel data or the G2-channel data from the illustrated image data enables producing the G-channel image data. The G-channel is divided into two channels, i.e., into the G1-channel and the G2-channel, so that extracting image data of any one of the R, G1, G2 and B channel data enables acquiring image data having the same resolution, which facilitates processes and data transformation performed thereon.

Next at step S12, the image processor 104 acquired information used for the sharpening process (main process). Specifically, the acquired information includes an ID number (lens ID) for specifying the image capturing optical system 101, the image capturing condition (a combination of the focal length, the F-number, the image capturing distance and others), the pixel pitch of the image sensor 102 and the tap number of the unsharp mask. The acquired lens ID and image capturing condition are used for acquiring the coefficient data, and the pixel pitch and tap number of the unsharp mask are used for discretizing the approximated PSF to produce the unsharp mask.

Description will be made of the unsharp mask USM with referring to FIGS. 7A and 7B. The tap number of the unsharp mask USM is set depending on an aberration characteristic of the image capturing optical system 101 and a required accuracy of the sharpening. FIG. 7A illustrates a two-dimensional unsharp mask USM having 11×11 taps. In FIG. 7A, values of the taps (tap values) are omitted. FIG. 7B illustrates a section of this unsharp mask USM. In FIG. 7B, a horizontal axis indicates taps, and a vertical axis indicates tap values. The unsharp mask USM ideally has a tap value distribution corresponding to a distribution of signal values spread due to aberration (i.e., the PSF of the image capturing optical system 101).

Next at step S13, the image processor 104 acquires the coefficients a, b, c, d, e, σ and β of the function of expression (8) used for reconstructing the PSF of the image capturing optical system 101 corresponding to the lens ID and image capturing condition acquired at step S12. In order to produce the approximated PSF corresponding to a certain image point, it is not necessarily needed to acquire data of all these coefficients. For example, the PSF on the optical axis has a rotationally symmetric shape as described above, so that a=c, b=0 and d=1. In addition, the coefficient β is a power term, and thereby changing the coefficient β increases processing load, so that the coefficient β may be fixed to 1. As described above, fixing the coefficient β decreases expressible shapes as compared to the case where the coefficient β is changeable, but makes it possible to reduce the coefficient data amount to be held in the memory 120 and reduce the processing load.

Furthermore, in order to improve the approximation accuracy, other coefficients may be added. For example, a PSF whose distribution spread is small and whose peak is high is difficult to be accurately fitted by the continuous function, so that the peak or a value near the peak may be set directly as the coefficient. Setting directly a peak area, where the distribution steeply changes, as the coefficient enables limiting an area to be reproduced by using the function to other area than the peak area, which improves the approximation accuracy. Moreover, at step S13, the coefficient calculator may acquire not only the coefficient data, but also the adjustment coefficient m used when the sharpening process.

This embodiment thus acquires the coefficient data, produces the approximated PSF using the coefficient data and produces the unsharp mask USM corresponding to the approximated PSF. Thereby, this embodiment enables, as compared to a case of directly holding the data of the PSF of the image capturing optical system 101, significantly reducing the data amount to be held while keeping the correction accuracy. For example, when the unsharp mask USM has the 11×11 taps as illustrated in FIGS. 7A and 7B, it is necessary to hold data of 121 taps. In addition, when separately holding the R, G and B channel data, it is necessary to hold data of 363 taps that is three times of 121. On the other hand, when holding the data of the coefficients, since the number of the coefficient in expression (8) is seven, it is only necessary hold data of 21 coefficients even when separately holding the R, G and B channel data. Thus, this embodiment holds the data of the coefficients to enable reducing the data amount to be held.

Next, at step S14, the image processor 104 (elliptical distribution producer 201) produces, by using the coefficient data acquired at step S13 and the function of expression (8), an elliptical distribution as a first distribution that is a non-rotationally symmetric distribution.

Figure 12A:
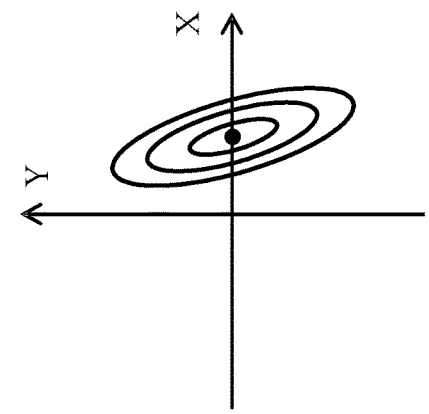
FIGS. 12A to 12F illustrate a mirroring process of elliptical distributions in each embodiment.

FIG. 12A illustrates the elliptical distribution produced by the elliptical distribution producer 201. In FIG. 12A, a point C is a center of the elliptical distribution produced by using the function of expression (8). The center C is located on the process target pixel. This embodiment produces the elliptical distribution, when reconstructing the approximated PSF on a certain image point that is the process target pixel, such that, with respect to the image capturing optical system 101, the X axis corresponds to the sagittal direction and the Y axis corresponds to the meridional direction. The Y axis corresponds to a straight line connecting a center of the input image and the process target pixel in the input image.

Ii is only necessary to use the rotational matrix of expression (6a) in order to make the X axis and the Y axis respectively coincide with the sagittal direction and the meridional direction. Performing a rotation process on the elliptical distribution produced at step S14 or on the approximated PSF reconstructed at next step S15 enables producing an elliptical distribution having a shape appropriate for an arbitrary image point.

When using the function of expression (8), the coefficient d provides an elliptical distribution having mutually different shapes in areas where Y≥0 and Y<0. As described above, controlling this coefficient d enables correcting aberration having an asymmetric shape in the meridional direction. Although FIG. 12A illustrates the elliptical distribution including a distribution of an area where x<0, since the distribution of the area where x<0 is produced from a distribution of an area where x≥0 at next step S15, the elliptical distribution producer 201 may produce only the elliptical distribution in the area where x≥0.

Figure 12D:
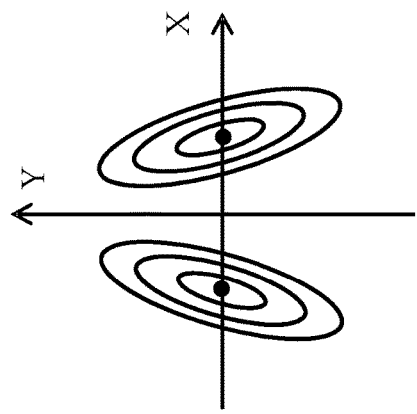
Figure 12B:
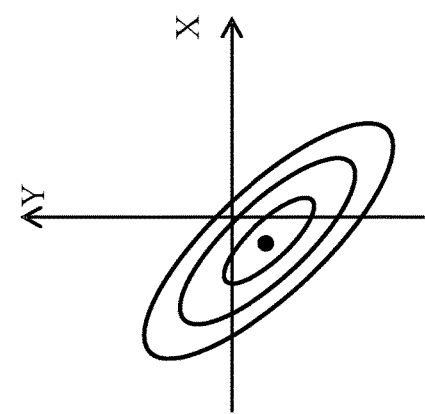

Next, at step S15, the image processor 104 (mirroring processor 202) mirrors (i.e., symmetrizes) the elliptical distribution produced at step S14 about the Y axis to produce a second distribution. FIG. 12D illustrates a distribution produced by mirroring the distribution of the area where x≥0, which is part of the elliptical distribution illustrated in FIG. 12A, about the Y axis (i.e., a plane including the Y axis) in the sagittal direction that is the X direction. The distribution of the area where x<0, which is produced by the mirroring, corresponds to expression (8c). Although the function of expression (8) is, as illustrated in FIG. 12A, a function expressing the elliptical distribution whose center is located at an intersection point of the X and Y axes, it is not necessarily needed that the center of the elliptical distribution is located at the intersection point of the X and Y axes. FIG. 12B illustrated an elliptical distribution in a case where the center of the elliptical distribution is not located at the intersection point of the X and Y axes. Translating the elliptical distribution illustrated in FIG. 12A produces such an elliptical distribution FIG. 12E illustrates a distribution produced by mirroring the distribution of the area where x≥0, which is part of the elliptical distribution illustrated in FIG. 12B, about the Y axis in the sagittal direction.

Figure 12E:
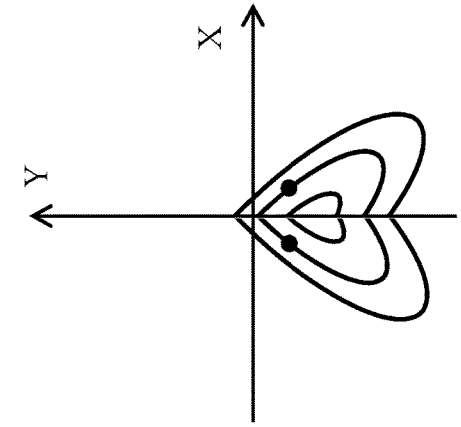
Figure 12C:
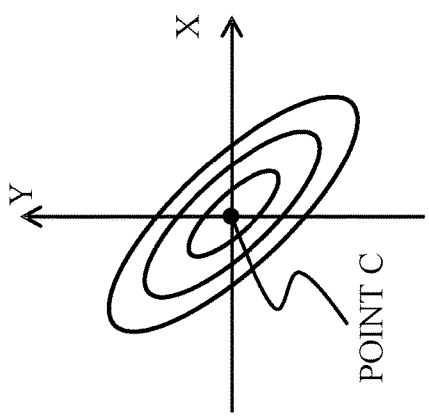
Figure 12F:
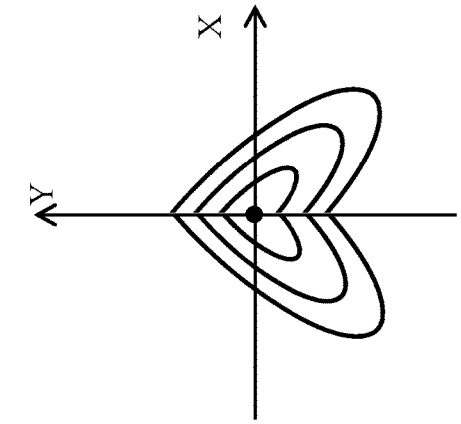

FIG. 12C also illustrates an elliptical distribution whose center is not located at the intersection point of the X and Y axes, as well as the elliptical distribution illustrated in FIG. 12B. However, mirroring such an elliptical distribution about the Y axis in the sagittal direction produces a distribution separated into two as illustrated in FIG. 12F. Such a distribution separated into two is less likely to correctly approximate the PSF of the image capturing optical system. Thus, performing the sharpening process using this distribution is highly likely not to provide a satisfactory sharpened image.

Accordingly, this embodiment produces, when using the elliptical distribution whose center is not located at the intersection point of the X and Y axes, a distribution in which at least two distributions partially overlap each other as illustrated in FIG. 12E. In other words, this embodiment produces the elliptical distribution as the first distribution such that this elliptical distribution overlaps the straight line (Y axis) connecting the center of the input image and the process target pixel and produces the second distribution by mirroring the part of the elliptical distribution (i.e., the distribution of the area where x≥0) about the plane including that straight line.

The overlap of the two elliptical distributions can be determined by, for example, evaluating values on the Y axis after the mirroring.

The image processor 104 (sharpening processor 203) uses, as the approximated distribution, the distribution produced by mirroring the part of the elliptical distribution by the mirroring processor 202 as described above to produce the unsharp mask USM as a first filter corresponding to the approximated PSF.

As a tap number of the produced unsharp mask, the tap number acquired at step S12 is used.

Next at steep S16, the sharpening processor 203 performs, by using the unsharp mask USM produced at step S15, the sharpening process on the input image according to expression (13). The adjustment coefficient m is set by taking account of image noise and correction excess and correction insufficiency. In the following description, [δ(x,y)+m×(δ(x,y)−USM(x,y))] that is part of expression (13) is hereinafter referred to as "a sharpening filter". The sharpening filter is produced using the unsharp mask USM. Since the PSF used for producing the unsharp mask USM changes with the image height, in order to increase the correction accuracy, it is desirable to change the unsharp mask with the image height.

Expression (13) can be transformed as follows.

$$g(x,y)=f(x,y)*[(1+m)\times\delta(x,y)-m\times USM(x,y)] \quad (14)$$

As described above, δ(x,y) acts only at its central tap, so that taps other than the central tap of the sharpening filter are set by m×USM(x,y).

Furthermore, since the sharpening filter keeps brightness before and after the correction, it is necessary to set the total of tap values of the sharpening filter to 1. Therefore, when m×USM(x,y) is set, the tap value of the central tap of the sharpening filter is automatically set. As just described, the sharpening filter may be produced by regarding δ(x,y) as being not only one filter, but also filters divided into the central tap and the other taps than the central tap. The sharpening filter produced by using expression (13) and the sharpening filter produced by using expression (14) express mutually equivalent processes.

Figure 13A:
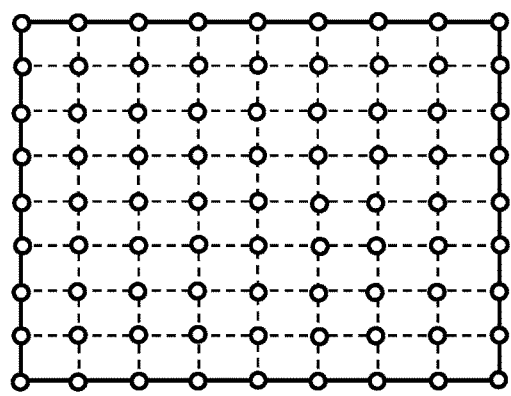
FIGS. 13A and 13B illustrate an interpolation of the unsharp mask in each embodiment.

FIG. 13A illustrates a relation between positions at which the unsharp masks are produced and the input image. A white circle indicates a position of the input image at which the unsharp mask is produced. In FIG. 13A, the unsharp mask is produced for each of 81 positions discretized in the input image. Performing a linear interpolation or the like on these unsharp masks enables producing the unsharp mask for any position in the input image, which enables applying an appropriate unsharp mask to any image height position.

Although FIG. 13A illustrates 81(=9×9) positions at which the unsharp masks are produced, the number of the positions may be reduced in order to reduce the processing load and may increase the number thereof in order to increase the correction accuracy.

Figure 13B:
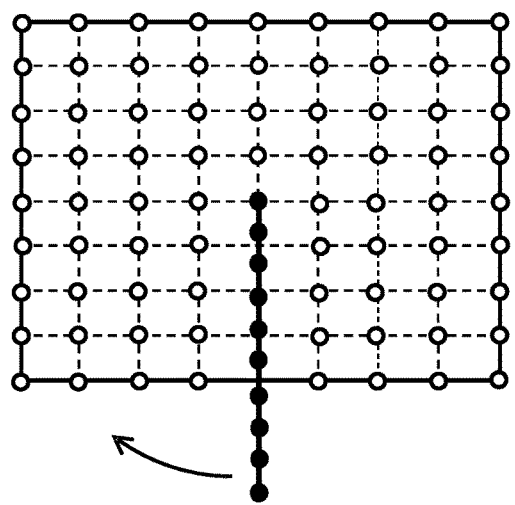

Furthermore, although the PSFs may be directly reconstructed at the respective positions of the white circles in FIG. 13A to produce the unsharp masks, these unsharp masks may be produced by an interpolation. FIG. 13B illustrates an example of the case where the unsharp masks are produced for the respective positions by the interpolation. Black points in FIG. 13B illustrate the positions at which the unsharp masks are produced at step S14. The PSF of the image capturing optical system is rotationally symmetric about the optical axis in general, so that the unsharp masks are also rotationally symmetric. The example of FIG. 13B utilizes the above characteristic to produce the unsharp masks for ten points in a downward direction from the center of the input image and rotates these unsharp masks about the center of the input image to produce the respective positions of the white circles by the interpolation. This process eliminates the necessity of producing the unsharp masks for all the positions in the input image, which reduces the processing lord.

This embodiment uses, for producing the unsharp mask, the approximated PSF produced by mirroring the elliptical distribution at step S15, so that it is only necessary, when performing the interpolation of the unsharp mask, to produce the approximated PSFs for positions corresponding to the black points in FIG. 13B.

Moreover, when changing the adjustment coefficient m depending on the image height, performing an interpolation of the adjustment coefficient m as well as the unsharp mask enables producing the adjustment coefficients m corresponding to the respective positions. As just described, using the interpolated adjustment coefficients m enables adjusting the correction amounts continuously for the image heights.

In addition, although expression (1) is expressed as an addition of the first and second terms, this is because the adjustment coefficient m is a positive value. When the adjustment coefficient m is a negative value, expression (1) will be expressed as a subtraction thereof. As just described, the addition and the subtraction only depend on signs of the adjustment coefficient m and therefore have essentially the same meaning. Thus, the addition and the subtraction may be arbitrary selected depending on the signs of the adjustment coefficient m.

This embodiment uses, for producing the unsharp mask, the approximated PSF produced from expression (8) corresponding to the PFS of the image capturing optical system and its coefficients. Accordingly, this embodiment enables sharpening the degradation of the input image, which is due to the asymmetric PSF of the image capturing optical system and is often seen in the peripheral part of the input image, with sufficient accuracy.

Embodiment 2

Next, description will be made of an image capturing optical system that is Embodiment 2. The image capturing apparatus has the same configuration as that of the image capturing optical system Embodiment 1. This embodiment performs the same processes as those of steps S11 to S15 illustrated in FIG. 1 and performs at step 16 the sharpening process as a different process from Embodiment 1.

In this embodiment, at step S16 the sharpening processor 203 performs, using the unsharp mask produced at step S15, the sharpening process on the input image according to expression (12). Although Embodiment 1 performs the sharpening by producing the sharpening filter and convoluting the sharpening filter on the input image, Embodiment 2 performs the sharpening by producing a correction component from the unsharp mask USM, adjusting the correction component with the adjustment coefficient m and then adding or subtracting the adjusted correction component to or from the input image.

In this embodiment, the sharpening filter produced on the basis of the information on the PSF is the unsharp mask USM, and f(x,y)*[δ(x,y)−USM(x,y)] that is a part of expression (12) is the correction component (correction data).

Although this embodiment adjusts the correction component with the adjustment coefficient m after producing the correction component, the adjustment coefficient m may be first applied to the unsharp mask USM or the ideal point image.

Although this embodiment performs a different process from that expressed by expression (13), this embodiment enables, as in Embodiment 1, sharpening the input image degraded due to the asymmetric PSF of the image capturing optical system with sufficient accuracy.

Embodiment 3

Next, description will be made of an image capturing apparatus that is Embodiment 3. The image capturing apparatus has the same configuration as that of the image capturing optical system Embodiment 1. This embodiment performs the same processes as those of steps S11 to S15 illustrated in FIG. 1 and performs at step 16 the sharpening process as a different process from Embodiment 1.

In this embodiment, at step S16 the sharpening processor 203 performs, using the unsharp mask produced at step S15, the sharpening process on the input image according to expression (11). This embodiment performs, as well as Embodiment 2, the sharpening by producing a correction component from the unsharp mask USM, adjusting the correction component with the adjustment coefficient m and then adding or subtracting the adjusted correction component to or from the input image. However, this embodiment is different in the correction component from Embodiment 2. This embodiment produces the correction component by taking difference between the input image and an image produced by convoluting the unsharp mask USM on the input image and performs the sharpening using that correction component. In this embodiment, the sharpening filter produced on the basis of the information on the PSF is the unsharp mask USM. Furthermore, [f(x,y)−f(x,y)*USM(x,y)] that is a part of expression (11) is the correction component (correction data).

Although this embodiment also adjusts the correction component with the adjustment coefficient m after producing the correction component, the adjustment coefficient m may be first applied to the input image and an image produced by convoluting the unsharp mask USM on the input image.

Although this embodiment performs a different process from those expressed by expressions (12) and (13), this embodiment enables, as well as Embodiments 1 and 2, sharpening the input image degraded due to the asymmetric PSF of the image capturing optical system with sufficient accuracy.

Although each of the above embodiments described the elliptical distribution as the example of the non-rotationally symmetric distribution, the non-rotational symmetric distribution includes any distribution that is other than the elliptical distribution and can be approximated by a function.

Each of the above described embodiments performs the sharpening process using the first filter that is acquired from the second distribution produced by mirroring the first distribution, which enables sharpening the input image degraded due to the complex-shaped PSF of the image capturing optical system.

Furthermore, each of the above described embodiments can reduce the required data amount as compared to the case of directly approximating the complex-shaped PSF.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-235443, filed on Dec. 2, 2015, which is hereby incorporated by reference herein in its entirety.

What is claimed is:

1. An image processing apparatus configured to perform image processing on an input image produced by image capturing through an optical system, the apparatus comprising:
a processor configured to execute a plurality of tasks, including:
a first distribution producing task configured to produce a first distribution by using data obtained by approximating a point spread function that corresponds to a condition relating to the image capturing;
a second distribution producing task configured to produce a second distribution by mirroring a part of the first distribution, the second distribution including the part of the first distribution;
a filter producing task configured to produce, by using the second distribution, a first filter to be used for a sharpening process; and
a processing task configured to perform the sharpening process on the input image by using the first filter to produce a sharpened image.

2. An image processing apparatus according to claim 1, wherein the first distribution is an elliptical distribution.

3. An image processing apparatus according to claim 1, wherein:
the first distribution producing task is configured to produce the first distribution such that the first distribution overlaps a straight line connecting a center of the input image and a process target pixel in the input image, and
the second distribution producing task is configured to produce the second distribution by mirroring the part of the first distribution about a plane including the straight line.

4. An image processing apparatus according to claim 1, wherein the processing task is configured (a) to take difference between the input image and an image obtained by applying the first filter to the input image to produce correction data and (b) to produce the sharpened image by using the correction data and the input image.

5. An image processing apparatus according to claim 1, wherein the processing task is configured (a) to produce correction data by applying a filter, which is produced on a basis of the first filter and on an ideal point image, to the input image and (b) to produce the sharpened image by using the correction data and the input image.

6. An image processing apparatus according to claim 1, wherein the processing task is configured (a) to produce a sharpening filter on a basis of the first filter and on an ideal point image and (b) to apply the sharpening filter to the input image to produce the sharpened image.

7. An image processing apparatus according to claim 1, wherein the data is data of coefficients a, b, c, d, e, $\sigma$, and $\beta$ included in following functions for approximating the point spread function:
when $x \leq 0$ and $y \geq 0$, $$P(x,y)=(\sigma+ax^2+2bxy+cy^2)^{-\beta}-e;$$

when $x \geq 0$ and $y<0$, $$P(x,y)=(\sigma+ax^2+2bdxy+cd^2y^2)^{-\beta}-e; \text{ and}$$

when $x<0$ $$P(x,y)=P(-x,y).$$

8. An image processing apparatus according to claim 1, wherein the condition relating to the image capturing includes at least one of a focal length, an F-number, an image capturing distance and an image height.

9. An image capturing apparatus comprising:
an image sensor configured to perform image capturing for producing an input image; and
an image processing apparatus configured to perform image processing on the input image produced by the image capturing through an optical system,
wherein the image processing apparatus comprises a processor configured to execute a plurality of tasks, including:
a first distribution producing task configured to produce a first distribution by using data obtained by approximating a point spread function that corresponds to a condition relating to the image capturing;
a second distribution producing task configured to produce a second distribution by mirroring a part of the first distribution, the second distribution including the part of the first distribution;
a filter producing task configured to produce, by using the second distribution, a first filter to be used for a sharpening process; and
a processing task configured to perform the sharpening process on the input image by using the first filter to produce a sharpened image.

10. An image processing method to perform image processing on an input image produced by image capturing through an optical system, the method comprising the steps of:
- producing a first distribution by using data obtained by approximating a point spread function that corresponds to a condition relating to the image capturing;
- producing a second distribution by mirroring a part of the first distribution, the second distribution including the part of the first distribution;
- producing by using the second distribution, a first filter to be used for a sharpening process; and
- performing the sharpening process on the input image by using the first filter to produce a sharpened image.

11. A non-transitory computer-readable storage medium storing a computer program to cause a computer to perform image processing on an input image produced by image capturing through an optical system, wherein the image processing includes:
- a process to produce a first distribution by using data obtained by approximating a point spread function that corresponds to a condition relating to the image capturing;
- a process to produce a second distribution by mirroring a part of the first distribution, the second distribution including the part of the first distribution;
- a process to produce, by using the second distribution, a first filter to be used for a sharpening process; and
- a process to perform the sharpening process on the input image by using the first filter to produce a sharpened image.

* * * * *